United States Patent [19]

Perry et al.

[11] Patent Number: 5,142,684

[45] Date of Patent: Aug. 25, 1992

[54] POWER CONSERVATION IN MICROPROCESSOR CONTROLLED DEVICES

[75] Inventors: Richard A. Perry, Charlotte, N.C.; Vernon L. Stant, Richmond, Va.

[73] Assignee: Hand Held Products, Inc., Charlotte, N.C.

[21] Appl. No.: 370,648

[22] Filed: Jun. 23, 1989

[51] Int. Cl.⁵ .............. G06F 15/16; G06F 1/08; G06F 1/26

[52] U.S. Cl. .................. 395/750; 395/550; 395/650; 364/707; 364/DIG. 1; 364/230.3; 364/231.1; 364/270.2; 364/281.4; 364/281.7; 364/273.1; 364/DIG. 2; 364/931.4; 364/942.5; 364/948.8

[58] Field of Search .................. 364/200, 900

[56] References Cited

U.S. PATENT DOCUMENTS

| | | |
|---|---|---|
| 3,941,989 | 3/1976 | McLaughlin et al. ............ 364/707 |
| 4,109,311 | 8/1978 | Blum et al. ............ 395/375 |
| 4,123,794 | 10/1978 | Matsumoto ............ 364/132 |
| 4,143,417 | 3/1979 | Wald et al. ............ 360/55 |
| 4,203,153 | 5/1980 | Boyd ............ 395/750 |
| 4,254,475 | 3/1981 | Cooney et al. ............ 395/550 |
| 4,317,181 | 2/1982 | Teza et al. ............ 364/707 |
| 4,366,540 | 12/1982 | Berglund et al. ............ 395/550 |
| 4,455,623 | 6/1984 | Wesemeyer et al. ............ 395/425 |
| 4,470,109 | 9/1984 | McNally ............ 395/325 |
| 4,627,025 | 12/1986 | Ninnemann et al. ............ 395/800 |
| 4,631,702 | 12/1986 | Korba ............ 395/550 |
| 4,670,837 | 6/1987 | Sheets ............ 395/550 |
| 4,673,805 | 6/1987 | Shepard et al. ............ 235/472 |
| 4,677,433 | 6/1987 | Catlin et al. ............ 340/825.2 |
| 4,696,019 | 9/1987 | Tulpule et al. ............ 375/107 |
| 4,819,164 | 4/1989 | Branson ............ 395/550 |
| 4,851,987 | 7/1989 | Day ............ 395/550 |
| 4,870,570 | 9/1989 | Satoh et al. ............ 395/750 |
| 4,893,271 | 1/1990 | Davis et al. ............ 395/550 |
| 4,916,441 | 4/1990 | Gombrich ............ 340/712 |
| 4,947,411 | 8/1990 | Shiraishi et al. ............ 377/47 |

FOREIGN PATENT DOCUMENTS

| | | |
|---|---|---|
| 0178642 | 4/1986 | European Pat. Off. |
| WO85/02275 | 6/1985 | PCT Int'l Appl. |
| 2134676 | 8/1984 | United Kingdom |

OTHER PUBLICATIONS

Ciarcia, Build Your Own Z80 Computer, 1981 pp. 1, 132, 259-262, 309-312.

Watch Chip For An MPU—Real-Time Clock Peripheral, B. Huston, Motorola, Inc., 8079 Electro/81 Conference Record, vol. 6 (1981), Apr. 7-9, New York, NY, pp. 1-8.

Method For Warning Users of a Low Battery Condition on a Battery-Powered Computer, IBM Technical Disclosure Bulletin vol. 29, No. 6, Nov. 1986, pp. 2641-2643.

Notification Concerning the Result of the Partial International Search—International Application No. PCT/US/90/03466, Nov. 13, 1990.

RTX 2000 TM Harris Corporation, May 1988.

Motorola MC68HCO4P4 Microcomputer Unit.

Maxim CMOS Fixed/Adjustable Output Step-Up Switching Regulators pp. 6—29-6—36.

NEC μPD7507/08 4-Bit, Single-Chip CMOS Microcomputers, NEC Electronics, Inc. pp. 3—8-9-3—107.

Primary Examiner—Gareth D. Shaw
Assistant Examiner—John C. Loomis
Attorney, Agent, or Firm—Bell, Seltzer, Park & Gibson

[57] ABSTRACT

Power may be conserved and battery life may be extended in a microprocessor controlled device by providing two microprocessors, one of which is a low power, low performance low speed processor for performing background tasks, the other of which is a high power, high performance, high speed processor for performing computationally intensive foreground tasks. The low speed processor activates the high speed processor when a high performance task is to be performed. When activating the high performance processor, the low performance processor also controls the device's power supply to provide high voltage to the high speed processor. The high speed processor may run at variable clock speeds, with power consumption of the processor increasing with increasing speed. The high speed processor selects its own clock speed based upon the task to be performed, by including a clock speed in each software subroutine which controls a task. The software subroutine associated with a task is thereby executed at its associated clock speed, which may be chosen to be the lowest possible clock speed consistent with the task to be performed.

66 Claims, 3 Drawing Sheets

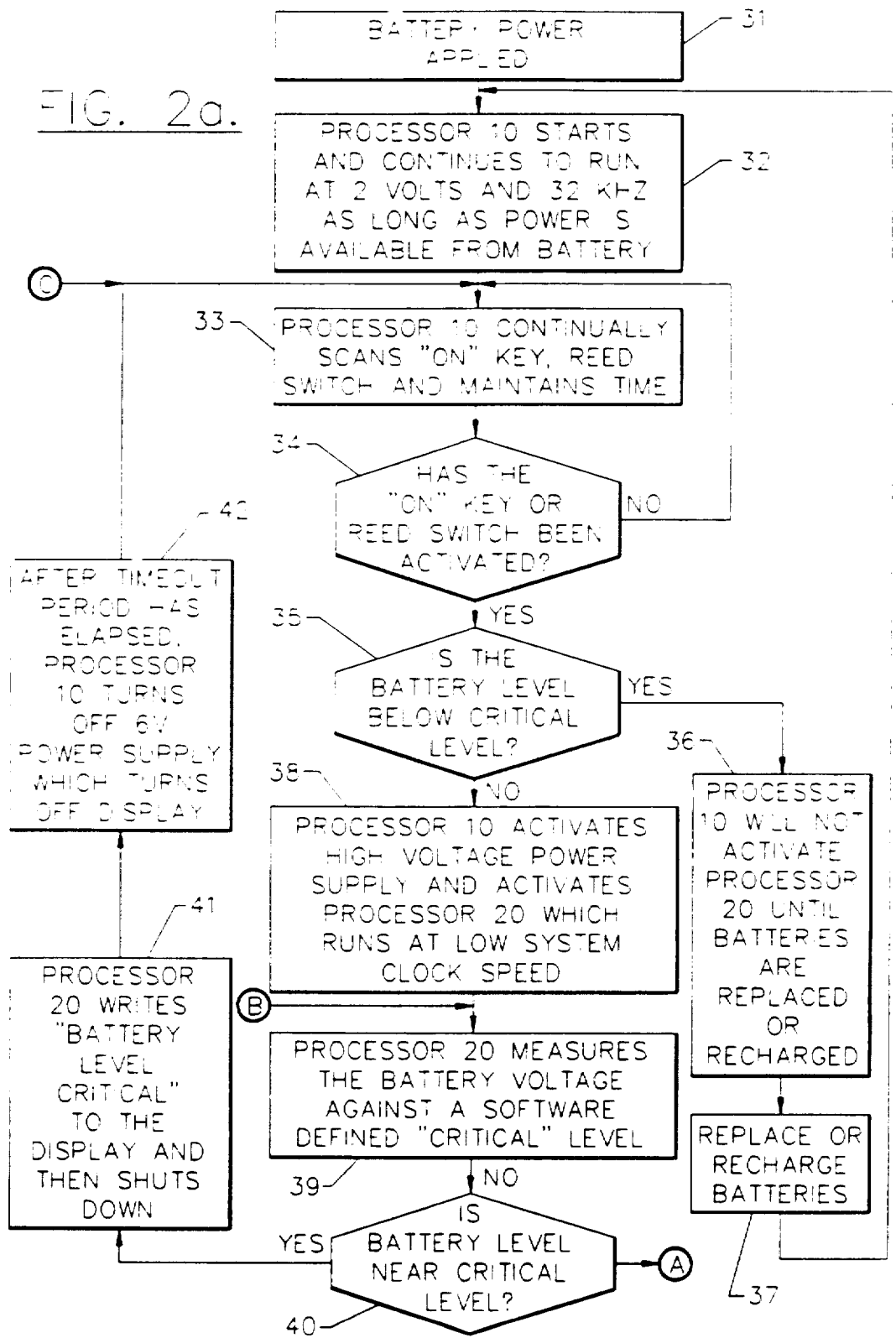

POWER CONSERVATION IN MICROPROCESSOR CONTROLLED DEVICES

FIELD OF THE INVENTION

This invention relates to microprocessor controlled devices, and more particularly to a method and apparatus for conserving power in microprocessor controlled devices.

BACKGROUND OF THE INVENTION

With the advent of low cost, high density integrated circuits, battery powered microprocessor controlled devices have become increasingly popular. One example of a battery powered microprocessor controlled device is a portable bar code reader of the type employed by overnight delivery services, supermarkets and others to scan and store bar code data.

A major limitation of battery powered microprocessor controlled devices is the battery life. Such devices are not useful in a practical sense if the battery life is too short. Of course, battery life may be extended by improving the batteries themselves or by providing more batteries in the device. However, such improvements often increase the cost, size and/or weight of the device.

Battery life may also be extended by improving the microprocessor control system so that it consumes less power during device operation. For example, U.S. Pat. No. 4,673,805 to Shepard et al. entitled Narrow-Bodied, Single-And Twin-Windowed Portable Scanning Head For Reading Bar Code Symbols discloses a system in which a trigger signal or keyboard entry activates a microprocessor in a scanner, which in turn activates a laser for bar code scanning. After a scan or data entry the microprocessor is deactivated. Unfortunately, for sophisticated battery powered devices, the microprocessor cannot be deactivated because there are certain "background" tasks, for example maintaining correct time of day, which must always be performed. A similar system is described in U.S. Pat. No. 4,203,153 to Boyd entitled Circuit For Reducing Power Consumption In Battery Operated Microprocessor Based Systems in which a microprocessor is powered up only during programmed task performance. A timer, which may be fixed or programmable, reactivates the microprocessor after a predetermined timing interval As stated above, sophisticated systems cannot permit the microprocessor to be deactivated.

It is known in the art to employ systems with two processors having different characteristics. For example, U.S. Pat. No. 4,677,433 to Catlin et al. entitled Two-Speed Clock Scheme For Co-Processors discloses a system including two processors one of which is a high speed microprocessor, the other of which is a low speed numeric data processor. The system runs at low speed when both processors must be used and runs at high speed when only the microprocessor needs to be used. A source control provides a high or low speed clock via a clocking generator which is coupled to both processors. There is no suggestion to use such a system for power conservation.

It is also known in the art to operate a microprocessor at two speeds to conserve power. For example, U.S. Pat. No. 4,254,475 to Cooney et al. entitled Microprocessor Having Dual Frequency Clock discloses a power conservation system in which a microprocessor operates at low speed until a sensor is activated or a predetermined time duration has passed. When either of these events occur, the high speed clock is activated. Similarly, a µPD7507/08 Four Bit Single Chip CMOS Microprocessor distributed by NEC Electronics, Inc. (Mountain View, Calif.) may be controlled to run at a plurality of clock speeds by a plurality of clock sources.

SUMMARY OF THE INVENTION

It is therefore an object of the invention to provide a method and apparatus for conserving power in microprocessor controlled devices.

It is another object of the present invention to provide a method and apparatus for extending battery life in battery powered microprocessor controlled devices.

It is yet another object of the present invention to provide a method and apparatus which allows background processing in a microprocessor controlled device without a large power drain.

It is still another object of the present invention to allow high performance foreground and low performance background processing in a microprocessor controlled device without a large power drain.

These and other objects are provided according to the invention by a microprocessor controlled device which employs two microprocessors. One of the microprocessors is a low power low performance low speed processor for performing background tasks. The other microprocessor is a high power high performance processor that may run at one of several high speeds for performing computationally intensive foreground tasks. According to the invention, the low speed microprocessor includes means for activating the high speed processor when a high performance task is to be performed. The low performance processor always remains activated, so that background tasks such as timekeeping may be performed. Power is thereby conserved, without the need to totally deactivate the system.

According to another aspect of the invention the low speed processor may operate with a low level (e.g. low voltage) power supply while the high speed processor requires a high level (e.g. high voltage) power supply. Accordingly, when activating the high performance processor the low performance processor also controls the power supply to provide high power level (e.g. high voltage) to the high speed processor. The use of multiple power supply levels which are a function of the task to be performed further extends battery life.

According to yet another aspect of the present invention the high speed processor may run at variable clock speeds, with power consumption of the processor increasing with increasing speed. The high speed processor executes a plurality of software subroutines for performing a plurality of tasks. According to the invention, the high speed processor selects its own clock speed based upon the task to be performed. This may be accomplished, according to the invention, by including a clock speed in each subroutine, preferably at the beginning of the subroutine. The high speed processor executes a software subroutine at the clock speed associated with that subroutine. This clock speed may be set to be the lowest possible clock speed consistent with the task to be performed.

As described above, battery life may be extended by providing a high performance processor which is activated by a low performance processor depending upon the task to be power only when the high performance processor is active; and by providing self control of the high performance processor speed. It will be recognized by those having skill in the art that each of the above described features may be employed separately or in connection with other features in order to extend battery life. It will also be recognized that the above described combination of features provides a system which is uniquely capable of performing computationally intensive foreground tasks and simple background tasks with minimal power drain.

It will also be recognized that advantages other than power conservation may be obtained according to the present invention. For example, use of a high performance processor only for computationally intensive tasks may reduce computer overhead and enhance the data processing efficiency of the overall system, because high performance processors are often not well suited for performing simple tasks. Moreover, the performance of all tasks at high speed may require high capacity peripheral devices which are only active for a small percentage of the device operation time. According to the invention, each task is performed at its lowest required speed, thereby preventing overload, permitting the use of lower capacity peripherals and enhancing system efficiency.

BRIEF DESCRIPTION OF THE DRAWINGS

FIG. 2A, 2B, 2C are flowcharts illustrating certain operations employed in the present invention.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
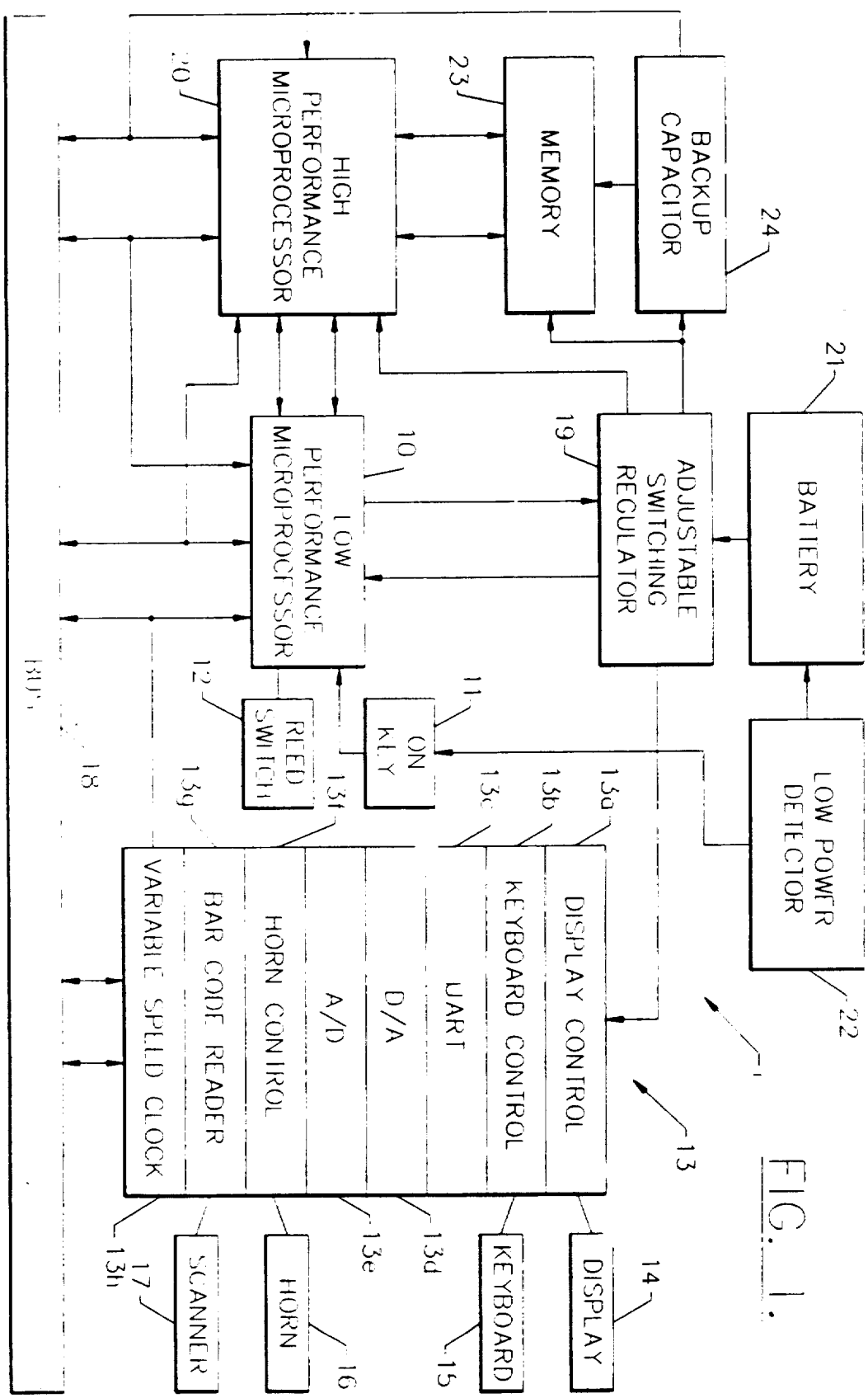
FIG. 1 IS a block diagram of a battery powered microprocessor controlled device according to the present invention.

Referring now to FIG. 1 a block diagram of a microprocessor controlled device according to the present invention is shown. According to the invention, microprocessor controlled device 1 includes a low performance microprocessor 10 and high performance microprocessor 20. In one embodiment, low performance microprocessor 10 may be a MC68HC04P4 Microcomputer Unit distributed by Motorola (Phoenix, Ariz.), which is an 8 bit microprocessor containing a central processing unit, on-chip clock, read only memory, random access memory, input and output buffers and a timer. This microcomputer is a low performance low power microprocessor which operates at a clock rate of 32 KHz and average current consumption of 10-20 μA. The low performance microprocessor 10 may be employed to refresh the display in the device, maintain the time of day, control the device power supply, control the keyboard, and activate a high performance microprocessor as will be described in detail below.

High performance microprocessor 20 may be an RTX 2000 Real Time Microcontroller distributed by Harris Corporation (Melbourne, Fla.). The RTX 2000 is a high performance 16 bit microcontroller with on chip timers, an interrupt controller and single cycle multiplier. The RTX 2000 employs single cycle instruction execution and may directly execute software written in FORTH, a high level language. The RTX 2000 may operate at variable clock speeds ranging from 0 up to 10 MHz, with power consumption being directly proportional to clock speed. For example, at a 1 MHz clock speed current consumption is approximately 3.5 mA while at 10 MHz, current consumption is approximately 35 mA. The RTX 2000 may be employed according to the invention for performing numerically intensive foreground tasks, such as bar code decoding and processing.

Still referring to FIG. 1, system 1 also includes an Application Specific Integrated Circuit (ASIC) 13 which, as is well known to those having skill in the art, is a customized integrated circuit which integrates many functions on a single chip. ASIC 13 may include a display control 13a which is connected to display 14, a keyboard control 13b which is connected to keyboard 15, a Universal Asynchronous Receiver/Transmitter (UART) 13c, digital to analog converters 13d, and analog to digital converters 13e. A horn control 13f which controls horn 16 may also be included as may be a bar code reader control 13g which controls the operation of bar code scanner 17. According to the invention a variable speed clock control 13h is also included in ASIC 13. It will be understood by those having skill in the art that the individual functions included in ASIC 13 also be provided using discrete components.

Low performance microprocessor 10, high performance microprocessor 20 and ASIC 13 may be interconnected for data transmission via a bus 18, as is Well known to those having skill in the art. Also connected to high performance microprocessor 20 is memory 23 which may include read/write memory and random access memory. Also connected to low performance microprocessor 10 is anon key 11 Which is part of keyboard 15 and a reed switch 12 which is the trigger for controlling data transfer to or from a charging and communications unit (not shown).

Low performance microprocessor 10 also controls an adjustable switching regulator 19. The adjustable switching regulator 19 may be an MAX631 Fixed/Adjustable Output Step Up Switching Regulator distributed by Maxim (Sunnyvale, Calif.), which is a high efficiency step up DC-DC converter for use in low power high efficiency switching regulator applications. A battery supply 21, for example two nickel cadmium or lithium batteries may be connected to the adjustable switching regulator 19. A low power detector 22 may also be connected between the battery 21 and low performance microprocessor 10. A backup capacitor 24 may also be connected between switching regulator 19, memory 23, high performance microprocessor 20 and low performance microprocessor 10 for providing short term backup power, for example when battery 20 is replaced.

The adjustable switching regulator 19 provides power for memory 23, high performance microprocessor 20, low performance microprocessor 10 and ASIC 13. It should be noted that low performance microprocessor 10, ASIC 13 and memory 23 require a minimum of 2V power supply for operation, while high performance microprocessor 20 requires a minimum of 5V power supply. According to the invention, the low performance microprocessor controls adjustable switching regulator 19 to boost the 2.4V battery voltage to 5V when the high performance microprocessor 20 is activated by the low performance processor. It should also be noted that low performance microprocessor 10, ASIC 13 and memory 23 may be run directly from the 2.4V supplied by two nickel cadmium or lithium batteries, without requiring an intervening switching regulator, to thereby provide maximum transfer efficiency from battery 21 at low voltage levels. The switching regulator 19 may be activated only when high performance microprocessor 20 is activated.

As may be seen from the block diagram of FIG. 1, low performance microprocessor may perform timekeeping and other background tasks and may continuously monitor for activation of the on key 11 or reed switch 12 or the need to perform another foreground task. When an appropriate foreground task is required, low performance microprocessor 10 may activate high performance microprocessor 20. It may also be seen that low performance microprocessor 10 and high performance microprocessor 20 may control the speed of variable speed clock 13h which governs the speed of high performance microprocessor 20.

Referring now to FIG. 2 the sequence of operations for controlling microprocessor controlled device 1 according to the present invention will now be described. It will be recognized by those having skill in the art that the sequence of operations described in FIG. 2 may be performed by low performance microprocessor 10 and high performance microprocessor 20 under control of a stored program which may reside in on-processor memory and/or in memory 23.

Referring now to FIG. 2A, when battery power is first applied to device 1 (Block 31), processor 10 runs with a 2V power supply and a clock speed of 32 khz as long as power is available from the battery (Block 32). At Block 33 processor 10 continually scans the On key 11 and the reed switch 12 and maintains time. Other background processing tasks may be performed as necessary.

When the on key 11 or reed switch 12 has been activated (Block 34), microprocessor 10 checks whether the battery level is below a critical level (Block 35). This test may be performed using low power detector 22. This test is performed to see whether there is sufficient battery power to activate high performance microprocessor 20. For a 2.4V system comprising two nickel cadmium batteries the test of Block 35 may be whether the battery voltage is 2.1V or less. If the battery voltage is below the critical level then at Block 36 processor 10 will not activate processor 20 until the batteries are replaced or recharged (Block 37). Processor 10 will, however, continue to perform background processing (Block 33).

If the battery level is above the critical level of Block 35, processor 10 activates the high voltage power supply using adjustable switching regulator 19, and activates processor 20 which runs at low system clock speed, for example 200 KHz (Block 38). High performance processor 20 runs at low clock speed until it has been determined that a higher clock speed is required to process a specific foreground task.

At Block 39 a second test of battery voltage is performed by processor 20. For a typical two nickel cadmium battery pack this level might be b 2.4V. This test is performed to see if there is enough power to run the high speed processor 20 at high speeds. If the voltage is near the critical level (Block 40) then processor 20 places a message on display 14 and then deactivates itself (Block 41). Then, after a predetermined timeout period (for example ten seconds) has elapsed, processor 10 turns off the high voltage power supply which turns off the display 14.

Figure 2B:
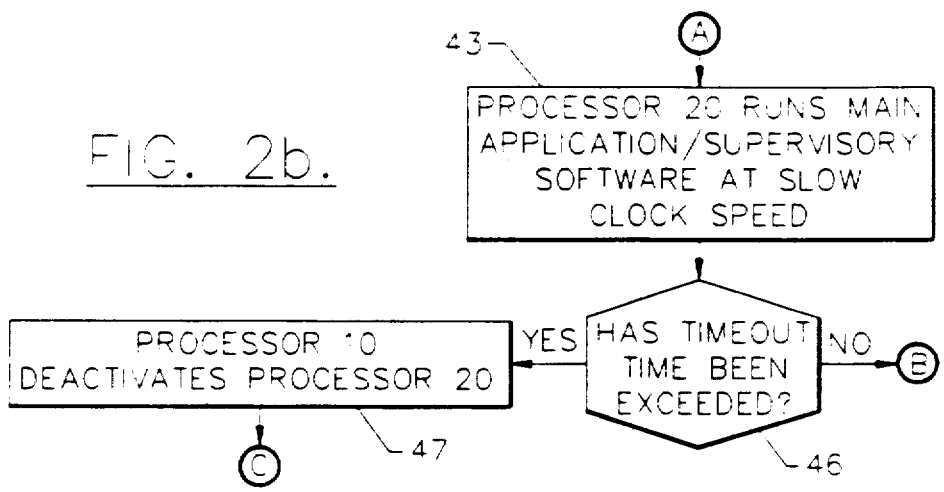

Referring now to FIG. 2B, processing continues at block 43 in which processor 20 runs the main application program and timeout test (Block 46) in a continuous loop unless an interrupt is received. A test is made at Block 46 to determine whether a predetermined time (for example ten seconds) has been exceeded. If not, processing continues. If the predetermined time has been exceeded, processor 10 deactivates processor 20 (Block 47).

Figure 2C:
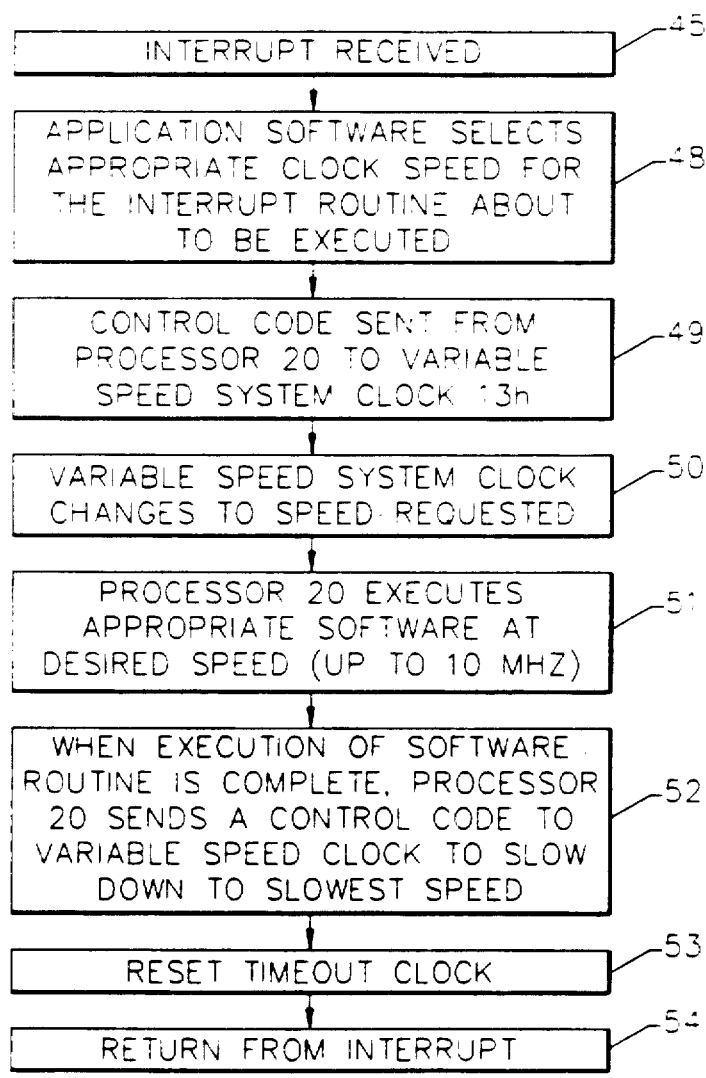

Referring now to FIG. 2C, when an interrupt is received (Block 45), indicating that a foreground task is to be performed, the application software selects the appropriate clock speed for the interrupt routine about to be executed (Block 48). According to the invention, each interrupt or other task to be performed is performed by a software subroutine. Associated with each software subroutine, preferably at the beginning thereof, is a clock speed code which indicates the appropriate clock speed for performing the task (Block 48). This clock speed code is examined and an appropriate control code is then sent from processor 20 to the variable speed system clock 13h in ASIC 13 (Block 49). The variable speed clock then changes the speed of high performance microprocessor 20 (Block 50).

In one embodiment, three clock speeds may be employed, for example 200 KHz, 1.6 MHz and 10 MHz. A control code associated with each subroutine determines the appropriate clock speed. In another embodiment, a large number of clock speeds may be employed, so that in effect a continuously variable clock speed is provided. The processor 20 executes the software at the preselected speed (Block 51). Referring to Block 52, when execution of the software routine is complete, processor 20 sends a control code to the variable speed clock to slow down to the slow speed. The timeout clock is reset (Block 53) and processing resumes at the point in the supervisory software loop where the interrupt occurred (Block 54).

The above description illustrates that battery power may be conserved and system efficiency enhanced according to the invention, by providing a low power low performance processor 10 which is continuously on for processing background tasks. High performance processor 20 is only activated when a foreground task needs to be performed. Similarly, the adjustable switching regulator 19 is maintained at low voltage when the low performance processor 10 is activated and is only switched to high voltage when the high performance processor 20 is active. Finally, when the high performance processor 20 is active the software routine for the foreground processing task controls the clock speed of the task so that processing may be accomplished as quickly as necessary with minimal power consumption. It has been found that when employing the present invention a hand held bar code scanner may typically be used for the duration of an eight hour shift without requiring replacement or recharging of its batteries. A similar hand held bar code scanner which does not employ the present invention may only operate for 2 or 3 hours of use.

In the drawings and specification, there have been disclosed typical preferred embodiments of the invention and, although specific terms are employed, they are used in a generic and descriptive sense only and not for purposes of limitation, the scope of the invention being set forth in the following claims.

that which is claimed is:

1. A method for controlling a multiprocessor system including a first processor having a first central processing unit operating under stored program control, and operating at a first speed and at a first power supply voltage or at a second power supply voltage which is greater than said first power supply voltage, and a second processor having a second processing unit operating under store program control, and operating at a second speed which is greater than said first speed, and at said second power supply voltage, and power supplying means for supplying said first or second power supply voltages to said first and second processors, said method comprising the steps of:
   operating said first processor at said first speed and at said first power supply voltage;
   determining whether a task is to be performed at said second speed;
   controlling said power supplying means to provide said second voltage to said first and second processing units if a task is to be performed at said second speed; and
   activating said second processor if a task is to be performed at said second speed.

2. The method of claim 1 wherein said controlling step is preceded by the step of determining whether sufficient power is available from said power supplying means to operate said power supplying means at said second power supply voltage if a task is to be performed at said second speed.

3. The method of claim 1 wherein said second speed comprises a plurality of second speeds, and wherein said activating step is followed by the step of:
   operating said second processor at one of said plurality of second speeds for performing the task.

4. The method of claim 3 wherein the step of operating said second processor at one of said plurality of second speeds for performing the task comprises the steps of:
   identifying the task to be performed at said second speed;
   activating a software routine for performing the identified task;
   identifying one of said plurality of second speeds associated with the activated software routine; and
   operating said second processor at the identified one of said plurality of second speeds for performing the task.

5. The method of claim 3 wherein the step of operating said second processor at one of said plurality of second speeds for performing the task is followed by the step of operating said second processor at a slow one of said plurality of second speeds after said task is performed.

6. The method of claim 1 wherein said activating step is followed by the step of continuing to operate said first processor at said first speed.

7. A method for controlling a multiprocessor system including a first processor having a first central processing unit operating under stored program control, and operating at a first speed and at a first power supply voltage or at a second power supply voltage which is greater than said first power supply voltage, and a second processor having a second central processing unit operating under stored program control, and operating at one of a plurality of second speeds at said second power supply voltage and a power supplying means for supplying said first and second power supply voltages in said first and second processors, said method comprising the steps of:
   operating said first processor at said first speed and at said first power supply voltage;
   determining whether a task is to be performed by said second processor;
   controlling said power supplying means to provide said second voltage to said first and said second processor if a task is to be performed by said second processor;
   activating said second processor if a task is to be performed by said second processor;
   identifying the task to be performed by said second processor;
   initiating execution of a software routine for performing the identified task;
   identify one of said plurality of second speeds corresponding with the activated software routine; and
   operating said second processor at the identified one of said plurality of second speeds for performing the task.

8. The method of claim 7 wherein said controlling step is proceeded by the step of determining whether sufficient battery power is available to operate said power supplying means at said second power supply voltage if a task is to be performed by said second processor.

9. The method of claim 7 wherein the step of operating said second processor is followed by the step of operating said second processor at a slow one of said plurality of second speeds after said task is performed.

10. A multiprocessor system comprising:
    a first processor having a first central processing unit operating under stored program control and operating at a first speed and at a first power supply voltage or at a second power supply voltage which is greater than said first power supply voltage for performing first tasks;
    a second processor having a second central processing unit operating under stored program control, and operating at a second speed which is greater than said first speed and at said second power supply voltage, said first processor including means for activating said second processor for performing second tasks at said second speed,
    power supplying means for supplying power to said first and second processors; and
    power supply control means, connected to said means for activating said second processor and to said power supply means, for controlling said power supplying means to provide said second power supply voltage to said first and second processors when said second processor is activated.

11. The multiprocessor system of claim 10 wherein said first processor consumes a first amount of power and wherein said second processor consumes a second amount of power which is greater than said first amount of power, said means for activating said second processor thereby minimizing power consumption in said multiprocessor system.

12. The multiprocessor system of claim 10 wherein said power supplying means includes a battery.

13. The multiprocessor system of claim 10 wherein said multiprocessor system is portable.

14. The multiprocessor system of claim 10 wherein said multiprocessor system is incorporated into a portable bar code reader.

15. The multiprocessor system of claim 14 further comprising:
a scanner connected to at least one of said first and second processors for reading and decoding bar codes under control of at least one of said first and second processors.

16. The multiprocessor system of claim 14 further comprising:
a keyboard connected to at least one of said first and second processors for accepting user inputs under control of at least one of said first and second processors.

17. The multiprocessor system of claim 14 further comprising:
a display connected to at least one of said first and second processors for displaying user information under control of at least one of said first and second processors.

18. The multiprocessor system of claim 14 further comprising:
a scanner connected to at least one of said first and second processors for reading and decoding bar codes under control of at least one of said first and second processors;
a keyboard connected to at least one of said first and second processors for accepting user inputs under control of at least one of said first and second processors; and
a display connected to at least one of said first and second processors for displaying user information under control of at least one of said first and second processors.

19. The multiprocessor system of claim 10 wherein said first tasks comprise background tasks and wherein said second tasks comprise foreground tasks.

20. The multiprocessor system of claim 19 wherein said background tasks comprise computationally simple tasks and wherein said foreground tasks comprise computationally intensive tasks.

21. The multiprocessor system of claim 10 wherein said first processor includes means for determining that a second task is to be performed; said means for activating said second processor comprising means for activating said second processor in response to said determining means.

22. The multiprocessor system of claim 10 wherein said first processor continues to operate at said first speed for performing said first tasks when said second processor operates at said second speed for performing said second tasks.

23. The multiprocessor system of claim 10 wherein said power supplying means includes a battery for supplying said first power supply voltage and a switching regulator connected to said battery for supplying said second power supply voltage.

24. The multiprocessor system of claim 10 wherein said second speed comprises a plurality of second speeds greater than said first speed, and wherein said multiprocessor system further comprises:
a variable speed clock, connected to said second processor, for operating said second processor at said plurality of second speeds; and
means for controlling said variable speed clock to operate at said one of said second speeds.

25. The multiprocessor system of claim 24 further comprising:
a plurality of stored program routines for controlling said second processor to perform said second tasks, each of said routines having one of said plurality of second speeds associated therewith; and
means for selecting one of said stored program routines to be performed; said means for controlling said variable speed clock being responsive to said means for selecting to thereby control said variable speed clock to operate at said one of said second speeds associated with the selected one of said stored program routines.

26. The multiprocessor system of claim 25 wherein said one of said plurality of second speeds associated with a respective one of said plurality of routines comprises the lowest speed with which the associated one of said plurality of tasks may be performed.

27. A multiprocessor system comprising:
a first processor having a first central processing unit operating under stored program control, and operating at a first power supply voltage level or at a second power supply voltage level which is greater than said first power supply voltage level for performing a first task;
a second processor having a second central processing unit operating under stored program control, and operating at said second power supply voltage level for performing a second task;
power supplying means for providing said first power supply voltage level to said first processor and for selectively providing said second power supply voltage level to said second processor; and
means for controlling said power supplying means to provide said second power supply voltage level to said first and second processors when said second task is performed.

28. The multiprocessor system of claim 27 wherein said means for controlling is included in said first processor.

29. The multiprocessor system of claim 27 wherein said power supplying means includes a battery.

30. The multiprocessor system of claim 27 wherein said power supply means includes a battery for supplying said first power supply voltage and a switching regulator connected to said battery for supplying said second power supply voltage.

31. The multiprocessor system of claim 27 wherein said multiprocessor system is portable.

32. The multiprocessor system of claim 27 wherein said multiprocessor system is a portable bar code reader.

33. The multiprocessor system of claim 27 wherein said first processor further comprises means for determining that said second task is to be performed; said determining means being connected to said means for controlling to thereby activate said second processor when said second task is to be performed.

34. The multiprocessor system of claim 27 further comprising:
a scanner connected to at least one of said first and second processors for reading and decoding bar codes under control of at least one of said first and second processors.

35. The multiprocessor system of claim 27 further comprising:
a keyboard connected to at least one of said first and second processors for accepting user inputs under control of at least one of said first and second processors.

36. The multiprocessor system of claim 27 further comprising:

a display connected to at least one of said first and second processors for displaying user information under control of at least one of said first and second processors.

37. The multiprocessor system of claim 27 further comprising:
- a scanner connected to at least one of said first and second processors for reading and decoding bar codes under control of at least one of said first and second processors;
- a keyboard connected to at least one of said first and second processors for accepting user inputs under control of at least one of said first and second processors; and
- a display connected to at least one of said first and second processors for displaying user information under control of at least one of said first and second processors.

38. The multiprocessor system of claim 27 wherein said first processor operates at a first speed and wherein said second processor operates at a plurality of second speeds greater than said first speed, wherein said task comprises a plurality of second tasks, and wherein said multiprocessor system further comprises:
- a variable speed clock connected to said second processor, for operating said second processor at said plurality of second speeds; and
- means, responsive to said first processor, for controlling said variable speed clock to operate at one of said second speeds.

39. The multiprocessor system of claim 38 further comprising:
- a plurality of stored program routines for controlling said second processor to perform said second tasks, each of said routines having one of said plurality of second speeds associated therewith; and
- means for selecting one of said stored program routines to be performed; said means for controlling said variable speed clock being responsive to said means for selecting to thereby control said variable speed clock to operate at said one of said second speeds associated with the selected one of said stored program routines.

40. The multiprocessor system of claim 38 wherein said one of said plurality of second speeds associated with a respective one of said routines comprises the lowest speed with which the associated one of said plurality of tasks may be performed.

41. The multiprocessor system of claim 27 wherein said first task comprises a background task and wherein said second task comprises a foreground task.

42. The multiprocessor system of claim 41 wherein said background task is a computationally simple task and wherein said foreground task is a computationally intensive task.

43. The multiprocessor system of claim 27 wherein said first operates at said second power supply voltage level for performing said first task while said second processor operates at said second power supply voltage level for performing said second task.

44. A data processing system comprising:
- a first stored program processor;
- a variable speed clock connected to said first processor, for operating said first processor at a plurality of speeds;
- a plurality of stored program routines for controlling said first processor to perform a plurality of tasks;
- a second stored program processor, said second processor including means for activating said first processor for performing said plurality of tasks;
- a plurality of stored speed data, each of which corresponds to one of said plurality of speeds a respective one of which correspond with a respective one of said stored program routines;
- means for selecting one of said stored program routines to be performed and the corresponding one of said stored speed data; and
- means for controlling said variable speed clock to operate said first processor at said one of said plurality of which corresponds with the selected one of said stored program routines.

45. The data processing system of claim 44 wherein said one of said plurality of preselected stored speed data which corresponds with a respective one of said routines comprises the lowest speed with which the corresponding one of said plurality of tasks only be performed.

46. The data processing system of claim 44 further comprising means for supplying power to said first processor.

47. The data processing system of claim 44 further comprising battery powered means for supplying power to said first processor.

48. The data processing system of claim 44 wherein said data processing system is portable.

49. The data processing system of claim 44 wherein said data processing system is a portable bar code reader.

50. The data processing system of claim 44 further comprising:
- a scanner connected to said first processor for reading and decoding bar codes under control of said first processor.

51. The data processing system of claim 44 further comprising:
- a keyboard connected to said first processor for accepting user inputs under control of said first processor.

52. The data processing system of claim 44 further comprising:
- a display connected to said first processor for displaying user information under control of said first processor.

53. The data processing system of claim 44 further comprising:
- a scanner connected to said first processor for reading and decoding bar codes under control of said first processor;
- a keyboard connected to said first processor for accepting user inputs under control of said first processor; and
- a display connected to said first processor for displaying user information under control of said first processor.

54. The data processing system of claim 44 wherein said second processor operates at a second speed and wherein said plurality of speeds are greater than said second speed.

55. The data processing system of claim 54 wherein said second processor consumes a second amount of power and wherein said first processor consumes a first amount of power which is directly proportional to the selected one of said plurality of speeds.

56. The data processing system of claim 44 wherein said second processor operates at a first power supply voltage or a second power supply voltage and said first processor operates at a said first power supply voltage; said data processing system further comprising a power supply for selectively supplying said first power supply voltage to said first processor and said second power supply voltage to said second processor; said data processing system further comprising power supply control means connected to said means for activating said first processor, for controlling said power supply to provide said first power supply voltage to said first and second processors while said first processor is active.

57. The multiprocessor system of claim 56 wherein said power supply means includes a battery for supplying said first power supply voltage and a switching regulator connected to said battery for supplying said second power supply voltage.

58. A multiprocessor system comprising:
 a first processor having a first central processing unit operating under stored program control, and operating at a first speed at a first power supply voltage or at a second power supply voltage which is greater than said first power supply voltage;
 a second processor having a second central processing unit operating under stored program control, and operating at a selected one of a plurality of second speeds, at said second power supply voltage;
 a power supplying means for providing said first power supply voltage to said first processor and selectively providing said second power supply voltage to said second processor;
 means in said first processor for performing background tasks;
 means in said first processor for determining that a foreground task is to be performed;
 means, responsive to said determining means, for controlling said power supply to provide said second power supply level to said second processor;
 means, responsive to said determining means, for activating said second processor to perform foreground tasks;
 a plurality of stored program routines for controlling said second processor to perform foreground tasks, each of said routines having one of said plurality of second speeds corresponding therewith;
 means for selecting one of said stored program routines to be performed; and
 means for operating said second processor at said one of said plurality of speeds corresponding with the selected one of said stored program routines, whereby power consumption in said multiprocessor system is minimized.

59. The multiprocessor system of claim 58 wherein said power supplying means includes a battery.

60. The multiprocessor system of claim 59 wherein said multiprocessor system is a portable multiprocessor system.

61. The multiprocessor system of claim 58 wherein said multiprocessor system is a portable bar code reader.

62. The multiprocessor system of claim 58 further comprising:
 a scanner connected to at least one of said first and second processors for reading and decoding bar codes under control of at least one of said first and second processors.

63. The multiprocessor system of claim 58 further comprising:
 a keyboard connected to at least one of said first and second processors for accepting user inputs under control of at least one of said first and second processors.

64. The multiprocessor of claim 58 further comprising:
 a display connected to at least one of said first and second processors for displaying user information under control of at least one of said first and second processors.

65. The multiprocessor system of claim 58 further comprising:
 a scanner connected to at least one of said first and second processors for reading and decoding bar codes under control of at least one of said first and second processors;
 a keyboard connected to at least one of said first and second processors for accepting user inputs under control of at least one of said first and second processors; and
 a display connected to at least one of said first and second processors for displaying user information under control of at least one of said first and second processors.

66. The multiprocessor system of claim 58 wherein said one of said plurality of second speeds associated with a respective one of said routines comprises the lowest speed with which the associated one of said foreground tasks may be performed.

* * * * *

UNITED STATES PATENT AND TRADEMARK OFFICE
CERTIFICATE OF CORRECTION

PATENT NO. :   5,142,684

DATED :   August 25, 1992

INVENTOR(S) :   Perry et al.

It is certified that error appears in the above-identified patent and that said Letters Patent is hereby corrected as shown below:

OTHER PUBLICATIONS:

Lines 18 and 19, "3-8-9-3-107." should be --3-89 — 3-107.--

Column 2, line 67, after "be" please insert --performed; by controlling the power supply to provide high--

Column 3, line 27, "IS" should be --is--.

Column 3, line 30, "FIG." should be --FIGS.--.

Column 3, line 35, "will now" should be --now will--.

Column 4, line 36, "anon" should be --on an--.

Column 4, line 36, "Which" should be --which--.

Column 4, line 55, "20" should be --21--.

Column 5, line 19, "13$h$" should be --13h--.

Column 5, line 32, "khz" should be --KHz--.

Column 5, line 34, "On" should be --on--.

UNITED STATES PATENT AND TRADEMARK OFFICE
CERTIFICATE OF CORRECTION

PATENT NO. : 5,142,684

DATED : August 25, 1992

INVENTOR(S) : Perry et al.

Page 2 of 3

It is certified that error appears in the above-identified patent and that said Letters Patent is hereby corrected as shown below:

Column 5, line 62, omit "b".

Column 6, line 24, "13*h*" should be --13h--.

Column 7, line 9, "store" should be --stored--.

Column 8, line 1, "in" should be --to--.

Column 8, line 17, "identify" should be --identifying--.

Column 8, line 23, "proceeded" should be --preceded--.

Column 11, line 57, after "first" insert --processor--.

Column 12, line 6, "correspond" should be --corresponds--.

Column 12, line 13, after "of" please insert --speeds--.

Column 12, line 19, "only" should be --may--.

Column 13, line 2, omit "a".

UNITED STATES PATENT AND TRADEMARK OFFICE
CERTIFICATE OF CORRECTION

PATENT NO.   : 5,142,684

DATED        : August 25, 1992

INVENTOR(S)  : Richard A. Perry

It is certified that error appears in the above-indentified patent and that said Letters Patent is hereby corrected as shown below:

Column 14, line 6, "59" should be --58--.

Signed and Sealed this

Seventh Day of September, 1993

Attest:

BRUCE LEHMAN

*Attesting Officer*   *Commissioner of Patents and Trademarks*